3,222,187
FLAVORING COMPOSITION
Max Winter, Petit-Lancy, Switzerland, assignor to Firmenich & Cie, Geneva, Switzerland
No Drawing. Filed May 2, 1963, Ser. No. 277,459
Claims priority, application Switzerland, May 2, 1962, 5,286/62
4 Claims. (Cl. 99—140)

The present invention relates to a flavoring composition which is useful for imparting a raspberry-like flavor to various foodstuffs and beverages. The invention also comprises foodstuffs and beverages having incorporated therein said flavoring composition.

The foodstuff industry uses raspberry juice, pulp, jams and jellies as well as other products derived from fresh, cooked or dried raspberries for flavoring various foodstuffs and beverages. One major disadvantage of these natural flavoring materials is due to their instability to the action of heat which is applied in many methods of food manufacture. Furthermore, many of the said natural flavoring materials undergo a rapid deterioration during and after their preparation due to oxidation by exposure to air, enzyme action and loss by evaporation of their most volatile constituents. Thus, the characteristic flavor and aroma of the fresh raspberry is to a large extent lost in the food products having incorporated therein such flavoring materials. The natural flavoring materials are also subject to seasonal variations which result in a lack of uniformity in their flavoring qualities. It has been proposed to overcome these disadvantages by the use of imitation raspberry flavors prepared by mixing aromatic materials of synthetic and natural origin. While some of these imitation flavors are satisfactory in some respects, they fail to impart to foodstuffs and beverages the fine and rich aroma of the freshly picked fruit. It is well known that it is practically impossible to reproduce artificially the natural raspberry flavor because of the complexity of its composition and the large number of known and unknown substances involved.

The disadvantages of the prior art flavoring materials used for imparting a raspberry flavor to foodstuffs and beverages can be obviated by my invention.

One object of this invention is to provide a new imitation raspberry flavor which, when incorporated in foodstuffs and beverages, will impart thereto the characteristic flavor of freshly picked raspberries.

Another object of this invention is to provide a stable imitation raspberry flavor made up of a relatively small number of ingredients and the flavoring characteristics of which are easily and uniformly reproducible at any time.

A further object of the invention is to provide a process for imparting to foodstuffs and beverages a raspberry flavor which is very similar to that of freshly picked raspberries.

The flavoring composition of this invention comprises as essential ingredients cis-3-hexen-1-al and at least one member of the group consisting of α-, β- and γ-ionones, α, β- and γ-irones and methyl-α-, β- and γ-ionones of the formula

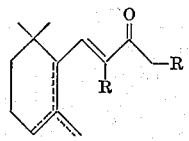

wherein one of the R's represents a methyl radical and the other is hydrogen. This group of ketones will be referred to hereinafter as "ionone compounds."

It was quite surprising to find that a composition comprising only two ingredients should be able to reproduce to a large extent the main characteristics of the natural fresh raspberry flavor which chemically is composed of a large number of compounds.

In a preferred embodiment the flavoring composition of this invention comprises 4-p-hydroxyphenyl-butan-2-one in addition to cis-3-hexen-1-al and the ionone compound.

The ionone compounds used in formulating the flavoring composition of the invention are known compounds the syntheses of which are described in the chemical literature and which are commercially available. Some of the commercial products are mixtures of isomeric ionone compounds. These mixtures can be used as well as individual ionone compounds in the composition of this invention. Commercial products which are suitable for carrying out the invention include, e.g., Violettone A (consisting essentially of α-ionone), Violettone B (consisting essentially of β-ionone), Iralia and Gallione (both consisting of mixtures of isomeric methylionones) (manufacturers of these products are Firmenich & Cie, Geneva, Switzerland). The irones can be obtained according to Swiss Patent Nos. 262,269, 262,270, 285,988 to 285,990, 273,699, 276,421 and 277,981.

The 4-p-hydroxyphenyl-butan-2-one used in a preferred embodiment of this invention is also a known compound which can be prepared, e.g., according to German Patent No. 1,079,065.

The cis-3-hexen-1-al which is one of the essential ingredients of the flavoring composition of this invention is a new compound which can be prepared as follows:

11.0 g. of 1-methoxy-cis-1-hexen-3-yne are added to a solution of sodium methoxide prepared from 4 g. of sodium and 50 ml. of methanol, and the solution is heated for 10 hours in a closed vessel at 110° C. The reaction mixture is then diluted twice with its volume of water, the whole is extracted 3 times with ether, and the extract is concentrated. The crude product is subjected to a fractional distillation, and the fraction distilling over at 60–62° C. at 10 mm. Hg is recovered. A freshly distilled sample of the thus obtained 1,1-dimethoxy-3-hexyne has the following properties: $n_D^{23.5} = 1.4360$; $d_4^{24.5} = 0.9055$.

13.0 g. of 1,1-dimethoxy-3-hexyne are hydrogenated in 50 ml. of hexane in the presence of 800 mg. of deactivated $Pd/CaCO_3$ catalyst. After 3½ hours 90% of the theoretical quantity of hydrogen have been absorbed. The hydrogenation is then interrupted, the hydrogenation mixture is treated in the usual manner, and the crude product is distilled to obtain 12.8 g. of 1,1-dimethoxy-cis-3-hexene having a purity of 95%. A sample purified by preparative gas-liquid chromatography has the following properties: $n_D^{23.2} = 1.4219$; $d_4^{24} = 0.8706$.

750 ml. of acetic acid and 15 g. of oxalic acid are placed in a 5 litre three-necked flask provided with a stirrer, a dropping funnel, a nitrogen inlet and outlet and a thermometer. The mixture is heated to 45° C. under nitrogen, and there are then added thereto 100 g. of 1,1-dimethoxy-cis-3-hexene and then distilled water. The rate of addition of water is adjusted in such a manner that the solution becomes just weakly turbid. As the hydrolysis proceeds, the addition of water is increased. After the introduction of 2 litres of water within 10 minutes the mixture remains homogeneous. Stirring is then continued for 10 minutes at 40° C., the mixture is cooled, saturated with sodium chloride and twice extracted with ether. The extract is washed three times with brine, solid sodium bicarbonate is added thereto in order to neutralise the acetic acid, washed again with brine and dried. After concentration of the extract the concentrate is distilled in a nitrogen atmosphere, and 38 g. of cis-3-hexen-1-al distilling at 63–65° C. at 65–70 mm. Hg are recovered. The analysis of a main fraction gives the following constants: $n_D^{21.8}=1.4300$; $d_4^{22}=0.8533$; IR spectrum: bands at 1720 cm.$^{-1}$ (strong, C=O), shoulder at 1692 cm.$^{-1}$ (weak, —C=C—C=O), 968 cm.$^{-1}$ (weak, C=C), 720 cm.$^{-1}$ (strong C=C) (2-hexen-1-al does not have any vibration at 720 cm.$^{-1}$).

*Analysis.*—Calculated for $C_6H_{10}O$: C, 73.43%; H, 10.27%. Found: C, 73.38%; H, 10.20%.

Depending on the reaction conditions used in the preparation of cis-3-hexen-1-al, the end product may contain some trans-3-hexen-1-al. It is not necessary to remove the trans-isomer, and mixtures of cis- and trans-3-hexen-1-al can also be used in the preparation of the flavoring composition of this invention provided that the proportion of the cis-isomer in these mixtures is substantially higher than that of the trans-isomer.

The ratio by weight between the cis-3-hexen-1-al and the ionone component in the flavoring composition can vary to a considerable extent. Good flavoring effects are obtained with compositions containing from 1 to 10 parts by weight of the ionone component per 1 part by weight of cis-3-hexen-1-al. However, these figures are purely illustrative and should not be construed as absolute limits. If 4-p-hydroxyphenyl-butan-2-one is used as a third component in the composition of this invention, the ratio by weight between the three ingredients may vary, for instance, between 1 and 10 parts by weight of ionone compound and 1 and 100 parts by weight* for each part by weight of cis-3-hexen-1-al. Again, these figures are illustrative only and do not constitute absolute limits. The ratio by weight between the ingredients of the flavoring composition will vary to some extent according to the type of foodstuff or beverage to be flavored.

It is advisable to use the flavoring composition of this invention in a dilute form in order to obtain a uniform distribution of the flavor in the foodstuffs. Diluents which may be used for this purpose include, e.g., alcohol, benzyl alcohol and triacetin.

The flavoring composition of this invention can be used for flavoring foodstuffs and beverages of various kinds, e.g., non-alcoholic beverages such as soft drinks, carbonated beverages, still beverages and syrups, alcoholic beverages such as liqueurs, confectionery of all kinds such as fondants, hard candy, caramels and chocolate-coated centres, icings, sandwich fillings, ice creams and frozen desserts, gelatin desserts, starch puddings, etc. The flavoring is also useful in the manufacture of effervescent powders for preparing beverages and for use in pharmaceutical preparations.

The quantities of flavoring composition required for imparting a raspberry flavor and aroma to foodstuffs and beverages vary and depend on the type of foodstuff or beverage to be flavored. As an example, the flavoring composition can be incorporated in foodstuffs and beverages in such quantities that the foodstuff or beverage will contain from 0.01 to 0.5 p.p.m. of cis-3-hexen-1-al and from 0.01 to 5 p.p.m. of ionone compound and, if the flavoring composition comprises also 4-p-hydroxyphenyl-butan-2-one, from 0.1 to 50 p.p.m. of this latter compound.

Neither the ionone compounds alone nor the cis-3-hexen-1-al alone are capable of imparting to foodstuffs and beverages a flavor reminiscent of raspberry. It is only the combination of both components which develops a fresh raspberry-like flavor and aroma.

Additional aromatics known in the flavoring art may be added to the flavoring composition of this invention. The aromatics which can be used for this purpose include esters such as ethyl acetate, geranyl acetate and amyl acetate, alcohols such as phenylethyl alcohol and geraniol; acids such as acetic and citric acids, aldehydes such as vanillin and ethyl-vanillin, lactones such as γ-undecalactone, etc.

The following examples which illustrate the invention are not to be construed as a limitation thereof.

*Example 1*

Three flavoring compositions were prepared by mixing the ingredients listed in the following table in the proportions indicated.

| Ingredients | Parts by weight | | |
|---|---|---|---|
| | I | II | III |
| Cis-3-Hexen-1-al (10% solution in triacetin) | 10 | 5 | 10 |
| Gallione [1] (10% solution in triacetin) | 50 | 50 | 10 |
| Triacetin (diluent) | 940 | 945 | 980 |
| | 1,000 | 1,000 | 1,000 |

[1] Mixture of isomeric methylionones obtained by condensing citral with butane-2-one and cyclising the reaction mixture.

These flavoring compositions were tested in a carbonated beverage, in a gelatin pudding, in a water ice and in hard sugar candies.

The carbonated beverage was prepared by adding 2 g. of 50% aqueous citric acid to 100 g. of a 65% aqueous sugar syrup and diluting the syrup with 600 g. of carbonated water. The flavoring composition was added to the syrup (prior to the dilution) in such quantities that the finished diluted beverage contained 15 to 30 g. of flavor per 500 kg. of beverage.

The gelatin pudding was prepared by mixing 20 g. of granulated sugar, 2.5 g. of gelatin powder and 0.5 g. of citric acid powder, adding 120 g. of warm water and finally incorporating the flavor composition in quantities of 10 to 20 g. per 100 kg. of pudding mix.

The water ice was prepared from a sugar syrup of 18° Baumé. To this syrup there were added 1 g. of citric acid and the flavoring composition in such quantities that the solution contained 15 to 45 g. of flavor per 100 kg. of solution. The solution was then placed in a freezer.

The sugar candies were prepared by dissolving 1000 g. of sugar in 600 ml. of water by heating and by dissolving 20 g. of glucose in 100 ml. of the resulting sugar syrup by heating at 140–145° C. The flavoring composition was then incorporated in such quantities that the finished candy mass contained 20 to 40 g. of flavor per 100 kg. of candy mass.

In the beverage and foodstuffs described above all three flavoring compositions I, II and III were found to develop a flavor which was similar to that of fresh raspberries.

*Example 2*

Three flavoring compositions were prepared by mixing the ingredients listed in the following table in the proportions indicated:

| Ingredients | Parts by weight | | |
|---|---|---|---|
| | I | II | III |
| Cis-3-hexen-1-al | 1 | 5 | 1 |
| Violettone A | 5 | 5 | 1 |
| 4-p-hydroxyphenyl-butan-2-one | 50 | 20 | 80 |
| Triacetin (diluent) | 944 | 970 | 918 |
| | 1,000 | 1,000 | 1,000 |

These three flavoring compositions were tested in the same manner as the compositions of Example 1 and were found to develop a fresh raspberry-like flavor with a more natural note.

*Example 3*

The following flavoring composition develops a very well-balanced, full fresh raspberry-like flavor in the beverage and foodstuffs described in Example 1.

---

* Of 4-p-hydroxyphenyl-butan-2-one.

| Ingredients: | Parts by weight |
|---|---|
| Cis-3-hexen-1-al | 1 |
| Iralia | 5 |
| 4-p-hydroxyphenyl-butan-2-one | 50 |
| γ-Undecalactone | 5 |
| Acetic acid | 20 |
| Ethyl acetate | 50 |
| Amyl propionate | 5 |
| Phenylethyl alcohol | 5 |
| Geraniol | 5 |
| Vanillin | 10 |
| Triacetin (diluent) | 844 |
| | 1000 |

I claim:

1. A flavoring composition for imparting a raspberry-like flavor to foodstuffs and beverages which comprises as essential flavor ingredients cis-3-hexen-1-al, at least one member selected from the group consisting of α-, β- and γ-ionones, α-, β- and γ-irones and α, β- and γ-methyl-ionones of the formula

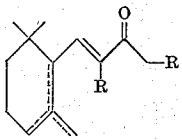

wherein one R is methyl and the other is hydrogen, and 4-p-hydroxyphenyl-butan-2-one.

2. A process for imparting a raspberry-like flavor to foodstuffs and beverages which comprises incorporating in said foodstuffs and beverages minute quantities of cis-3-hexen-1-al and of at least one member selected from the group consisting of α-, β- and γ-ionones, α-, β- and γ-irones and α-, β- and γ-methyl-ionones of the formula

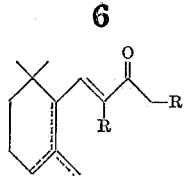

wherein one of the R's represents the methyl radical and the other is hydrogen.

3. A process according to claim 2 wherein minute quantities of 4-p-hydroxyphenyl-butan-2-one are also incorporated in said foodstuffs and beverages.

4. Foodstuffs and beverages having a raspberry-like flavor due to the presence therein of minute quantities of cis-3-hexen-1-al, of at least one member selected from the group consisting of α-, β- and γ-ionones, α-, β- and γ-irones and α-, β- and γ-ionones of the formula

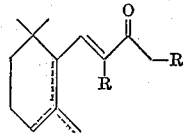

wherein one R is methyl and the other is hydrogen, and of 4-p-hydroxyphenyl-butan-2-one.

References Cited by the Examiner

Merory, "Food Flavorings—Composition, Manufacture and Use," 1960, The Avi Publishing Co., Inc. Westport, Conn., pp. 47 to 51, 77, 184, 191.

Winter et al., Helvetica Chimica Acta, 45, pp. 2195–2211 (1962) (as abstracted in Chemical Abstracts, vol. 58, February 1963), 3830e.

A. LOUIS MONACELL, *Primary Examiner.*